United States Patent
Egboiyi et al.

(12)

(10) Patent No.: US 11,549,872 B2
(45) Date of Patent: Jan. 10, 2023

(54) METHODS AND APPARATUS FOR DETERMINING A CRUSH STRENGTH OF AN EDGE

(71) Applicant: CORNING INCORPORATED, Corning, NY (US)

(72) Inventors: Benedict Osobomen Egboiyi, Painted Post, NY (US); James Edward Morrison, Jr., Campbell, NY (US); Patrick Ryan Pruden, Corning, NY (US); Ananthanarayanan Subramanian, Corning, NY (US)

(73) Assignee: Corning Incorporated, Corning, NY (US)

( * ) Notice: Subject to any disclaimer, the term of this patent is extended or adjusted under 35 U.S.C. 154(b) by 303 days.

(21) Appl. No.: 16/537,004

(22) Filed: Aug. 9, 2019

(65) Prior Publication Data
US 2020/0056968 A1 Feb. 20, 2020

Related U.S. Application Data

(60) Provisional application No. 62/718,547, filed on Aug. 14, 2018.

(51) Int. Cl.
*G01N 3/08* (2006.01)
*G01N 3/04* (2006.01)

(52) U.S. Cl.
CPC .............. *G01N 3/08* (2013.01); *G01N 3/04* (2013.01); *G01N 2203/0003* (2013.01);
(Continued)

(58) Field of Classification Search
CPC .... G01N 3/08; G01N 3/04; G01N 2203/0003; G01N 2203/0019; G01N 2203/0032;
(Continued)

(56) References Cited

U.S. PATENT DOCUMENTS 3,937,073 A 2/1976 Steel
4,395,917 A 8/1983 Maltby et al.
(Continued)

FOREIGN PATENT DOCUMENTS

| AT | 412422 B | * | 1/2005 | ............... G01N 3/04 |
| CN | 103108842 A | | 5/2013 | |

(Continued)

OTHER PUBLICATIONS

Invitation to Pay Additional Fees of the European International Searching Authority; PCT/US2019/045902; dated Nov. 29, 2019; 12 Pgs.
(Continued)

*Primary Examiner* — Jonathan M Dunlap
(74) *Attorney, Agent, or Firm* — Kevin Johnson; Kapil Banakar

(57) ABSTRACT

A test apparatus comprises a probe movably mounted relative to a carrier. The probe comprises an end portion with a surface area of about 5 mm$^2$ or less. The test apparatus can be used in methods of determining a crush strength of an edge of a substrate. Methods can comprise aligning the probe with a test location of the substrate at a predetermined angle relative to a probe axis. Methods can further comprise applying a mechanical force to the test location with the probe in the direction of the probe axis. Also, methods can comprise increasing the mechanical force applied by the probe until the substrate cracks or a predefined force applied by the probe is reached. Based on the mechanical force applied by the probe, a crush strength of an edge can be determined.

19 Claims, 6 Drawing Sheets

(52) U.S. Cl.
CPC ............... *G01N 2203/0019* (2013.01); *G01N 2203/0032* (2013.01); *G01N 2203/0087* (2013.01); *G01N 2203/0676* (2013.01); *G01N 2203/0682* (2013.01)

(58) Field of Classification Search
CPC ... G01N 2203/0087; G01N 2203/0676; G01N 2203/0682
See application file for complete search history.

(56) References Cited

U.S. PATENT DOCUMENTS

| | | | |
|---|---|---|---|
| 4,729,698 | A | 3/1988 | Haddon |
| 5,219,379 | A | 6/1993 | Good et al. |
| 5,969,262 | A | 10/1999 | Ino et al. |
| 7,070,837 | B2 | 7/2006 | Ross |
| 8,960,014 | B2 | 2/2015 | Sharps et al. |
| 9,472,374 | B2 * | 10/2016 | Cyrankowski ............ G21K 5/10 |
| 9,664,603 | B2 | 5/2017 | Heiss-Chouquet et al. |
| 9,784,655 | B2 | 10/2017 | Heiss-Chouquet et al. |
| 9,801,297 | B2 | 10/2017 | Amin et al. |
| 10,613,007 | B2 * | 4/2020 | Agnello ............... G01N 3/20 |
| 10,663,380 | B2 * | 5/2020 | Cyrankowski ........... G01N 3/46 73/81 |
| 11,237,087 | B2 * | 2/2022 | Cyrankowski ........... G01N 3/56 73/7 |
| 2002/0104371 | A1 * | 8/2002 | Gitis ....................... G01N 3/46 73/81 |
| 2007/0279853 | A1 | 12/2007 | Hung et al. |
| 2008/0083288 | A1 * | 4/2008 | Glaesemann ........... G01N 3/20 73/849 |
| 2012/0052302 | A1 | 3/2012 | Matusick et al. |
| 2012/0103055 | A1 * | 5/2012 | Ryan ...................... G01N 3/56 73/7 |
| 2014/0083198 | A1 | 3/2014 | Sharps et al. |
| 2014/0231670 | A1 * | 8/2014 | Cyrankowski ........... G01N 3/42 250/442.11 |
| 2016/0299498 | A1 * | 10/2016 | Valenzuela ............... G01N 3/42 |
| 2017/0030812 | A1 * | 2/2017 | Cyrankowski ......... G02B 21/26 |
| 2017/0074763 | A1 * | 3/2017 | Sawa ...................... G01N 3/42 |
| 2017/0089818 | A1 | 3/2017 | Bartlow et al. |
| 2017/0108420 | A1 * | 4/2017 | Burns ..................... G01N 3/42 |
| 2018/0073967 | A1 * | 3/2018 | Agnello .................. G01N 3/20 |
| 2020/0408655 | A1 * | 12/2020 | Cyrankowski ........... G01N 3/20 |

FOREIGN PATENT DOCUMENTS

| | | | |
|---|---|---|---|
| CN | 105157967 A * | 12/2015 | ............... G01N 3/46 |
| EP | 2128105 A1 | 12/2009 | |
| WO | WO-2008082218 A1 * | 7/2008 | ............... G01N 3/46 |
| WO | 2012/027133 A2 | 3/2012 | |
| WO | WO-2012133690 A1 * | 10/2012 | ......... G01N 35/0099 |
| WO | WO-2016149016 A1 * | 9/2016 | ............... G01N 3/20 |
| WO | WO-2019030970 A1 * | 2/2019 | ............... G01N 3/42 |

OTHER PUBLICATIONS

Anderson; "Fracture Mechanics Fundamentals and Applications". (2005) ISBN 10:0849316561. CRC Press; pp. 14-100.
Buono et al; "Screen Protector Comprising a Glass-Based Substrate and an Adhesive"; Filed as U.S. Appl. No. 16/538,337, filed Aug. 12, 2019; 45 Pages.
C1499-15 ASTM Standard; "Monotonic Equibiaxial Flexural Strength of Advanced Ceramics at Ambient Temperature"; (2019) 13 Pages.
C158 ASTM Standard; "Strength of Glass by Flexure (Determination of Modulus of Rupture)"; (2017); 9 Pages.
Dowling; "Mechanical Behavior of Material-Engineering Methods for Deformation, Fracture, and Fatigue". Prentice Hall; (1998); pp. 286-356.
Gulati "Edge Strength Testing of Thin Glasses" Intl. J. App. Glass Sci 2 (2011): 39-46.
Pantelides "Edge Strength of Window Glass by Mechanical Test"; J. Eng. Mech. 120 (1994): 1076-1090.

* cited by examiner

METHODS AND APPARATUS FOR DETERMINING A CRUSH STRENGTH OF AN EDGE

CROSS-REFERENCE TO RELATED APPLICATIONS

This application claims the benefit of priority under 35 U.S.C. § 119 of U.S. Provisional Application Ser. No. 62/718,547 filed on Aug. 14, 2018, the content of which is relied upon and incorporated herein by reference in its entirety.

FIELD

The present disclosure relates generally to methods and apparatus for determining a mechanical property of an edge and, more particularly, to methods and apparatus for determining a mechanical property of an edge of a substrate with a carrier movably mounted relative to a probe.

BACKGROUND

The mechanical properties of brittle material in bulk can be undermined by a single, weaker location or point of stress concentration. In sheets of brittle materials (e.g., glass sheets, glass-based sheets, ceramic plates, and silicon wafers), stress concentrations often occur at the edge of the sheet. To reduce such stress concentrations, surfaces may be finished by beveling, polishing, or etching to change the surface profile of the brittle material. As such, there is a desire to determine material properties at the edge of a finished sheet of brittle material. Further, there is a desire to determine material properties at the edge of a finished sheet of brittle material under actual use conditions.

It is known to test properties of objects with predetermined geometries. However, such tests do not reflect the surface profile or edges that may be used in a finished product. Also, it is known to test material properties at an edge by imposing a non-contact stress (e.g., thermal stress). However, such tests fundamentally fail for materials with low thermal expansion coefficients. Moreover, such tests often do not reflect the type of failure encountered in actual use. Additionally, it is known to test material properties at an edge by applying a mechanical force to deform an entire sheet of material. However, such tests can be costly to perform because fracture can occur at locations other than an edge, requiring the multiple samples to acquire even a single usable data point. Further, such tests are not suitable for materials comprising a curved surface profile or finished materials where the strength of the edge may be comparable to the bulk strength of the material.

Consequently, there is a need for testing apparatus and methods that more efficiently and more accurately measure material properties at the edge of a finished sheet of material. Further, there is a need for such a test apparatus and methods suitable for materials comprising surface profiles with one or more curved portions. Still further, there is a need for test apparatus and methods to test mechanical properties under actual usage conditions (e.g., when a screen protector is applied to the device it is designed to protect).

SUMMARY

There are set forth methods and apparatus that can apply a concentrated load to a predetermined test location at or near an edge to determine properties at the edge of a finished sheet of material. The test apparatus and methods can be used with material comprising surface profiles that comprise a curved portion. Also, the test apparatus and methods can be used to simulate failure under actual usage conditions (e.g., when a screen protector is applied to the device it is designed to protect).

Some example embodiments of the disclosure are described below with the understanding that any of the embodiments may be used alone or in combination with one another.

Embodiment 1

A test apparatus may comprise a carrier and a probe movably mounted relative to the carrier. The probe may comprise an end portion extending 0.25 mm from an outer tip of the probe. A surface area of the end portion can be about 5 $mm^2$ or less.

Embodiment 2

The test apparatus of embodiment 1, where the carrier may comprise a plate.

Embodiment 3

The test apparatus of any one of embodiments 1 and 2, where the carrier may be rotatable about a first adjustment axis.

Embodiment 4

The test apparatus of embodiment 3, where probe may be movable relative to the carrier along a probe axis that can be perpendicular to the first adjustment axis.

Embodiment 5

The test apparatus of any one of embodiments 3 and 4, wherein the test apparatus may further comprise a lock to releasably fix the carrier in a selected position relative to the first adjustment axis.

Embodiment 6

The test apparatus of any one of embodiments 3-5, where the carrier may be rotatable about a second adjustment axis perpendicular to the first adjustment axis and the probe axis.

Embodiment 7

The test apparatus of any one of embodiments 1-6, where the carrier may comprise a clamp.

Embodiment 8

The test apparatus of any one of embodiments 1-7, where the probe may comprise a thermoplastic polymer.

Embodiment 9

The test apparatus of any one of embodiments 1-8, where the carrier may comprise a thermoplastic polymer.

Embodiment 10

The test apparatus of any one of embodiments 1-9, where the probe can comprise a first surface and a second surface. The first surface and the second surface can converge toward the outer tip of the probe.

Embodiment 11

The test apparatus of embodiment 10, where the probe can comprise a third surface that intersects the first surface and the second surface while tapering toward the outer tip of the probe.

Embodiment 12

The test apparatus of any one of embodiments 1-11, wherein the test apparatus may further comprise a device configured to determine one or more of a force, a displacement, or a pressure applied by the probe.

Embodiment 13

Methods of determining a crush strength of an edge of a substrate comprising a first major surface and a second major surface with the edge extending between the first major surface and the second major surface. The methods can comprise adjusting a predetermined angle between the substrate and a direction of a probe axis. Methods can further comprise applying a mechanical force to a first test location of the substrate with a probe in the direction of the probe axis. Methods can also comprise increasing the mechanical force applied by the probe in the direction of the probe axis until the substrate cracks or a predefined force applied by the probe is reached. Methods can also comprise determining the crush strength of the edge based on the mechanical force applied by the probe.

Embodiment 14

Methods of determining a crush strength of an edge of a substrate comprising a first major surface and a second major surface with the edge extending between the first major surface and the second major surface. The methods can comprise aligning a probe with a first test location of the substrate at a predetermined angle between the substrate and a direction of a probe axis. The first test location can be about 10 mm or less from the edge of the substrate. Methods can further comprise applying a mechanical force to the first test location of the substrate with the probe in the direction of the probe axis. Methods can also comprise increasing the mechanical force applied by the probe in the direction of the probe axis until the substrate cracks or a predefined force applied by the probe is reached. Methods can further comprise determining the crush strength of an edge based on the mechanical force applied by the probe.

Embodiment 15

The methods of any one of embodiments 13 and 14, where the edge may comprise a curved edge surface.

Embodiment 16

The methods of embodiment 15, where the first test location may comprise a portion of the curved edge surface of the edge.

Embodiment 17

The methods of any one of embodiments 13-16, where the first major surface can comprise one or more of a curved surface or a flat surface.

Embodiment 18

The methods of any one of embodiments 13 and 14, where the first test location may comprise a portion of a surface of the edge.

Embodiment 19

The methods of any one of embodiments 13-15, where the first test location may comprise a portion of the first major surface of the substrate.

Embodiment 20

The methods of embodiment 19, where the portion of the first major surface of the substrate may be curved.

Embodiment 21

The methods of embodiment 19, where the portion of the first major surface of the substrate may be flat.

Embodiment 22

The methods of any one of embodiments 13-21, where the probe comprises a first surface and a second surface. The first surface of the probe and the second surface of the probe converge toward an outer tip of the probe.

Embodiment 23

The methods of embodiment 22, where the probe further comprises a third surface that intersects the first surface and the second surface while tapering toward the outer tip of the probe.

Embodiment 24

The methods of any one of embodiments 13-23, where the second major surface of the substrate may be attached to a major surface of a glass-based substrate during the methods of determining the strength of the edge of the substrate.

Embodiment 25

The methods of any one of embodiments 13-24, where the predetermined angle can be within a range of from about 0° to about 45°.

Embodiment 26

The methods of embodiment 25, where the predetermined angle can be within a range from about 30° to about 45°.

Embodiment 27

The methods of any one of embodiments 13-26, where the first test location may be less than or equal to about 10 mm from the edge of the substrate.

Embodiment 28

The methods of any one of embodiments 13-27, where the predefined force applied by the probe can be within a range from about 50 N to about 200 N.

Embodiment 29

The methods of embodiment 28, where the predefined force applied by the probe can be within a range from about 50 N to about 125 N.

Embodiment 30

The methods of any one of embodiments 13-29 may further comprise applying a mechanical force to a second test location of the substrate and increasing the applied mechanical force until the substrate cracks or a predefined force applied by the probe is reached.

BRIEF DESCRIPTION OF THE DRAWINGS

The above and other features and advantages of embodiments of the present disclosure are better understood when the following detailed description is read with reference to the accompanying drawings, in which.

DETAILED DESCRIPTION

Figure 1:
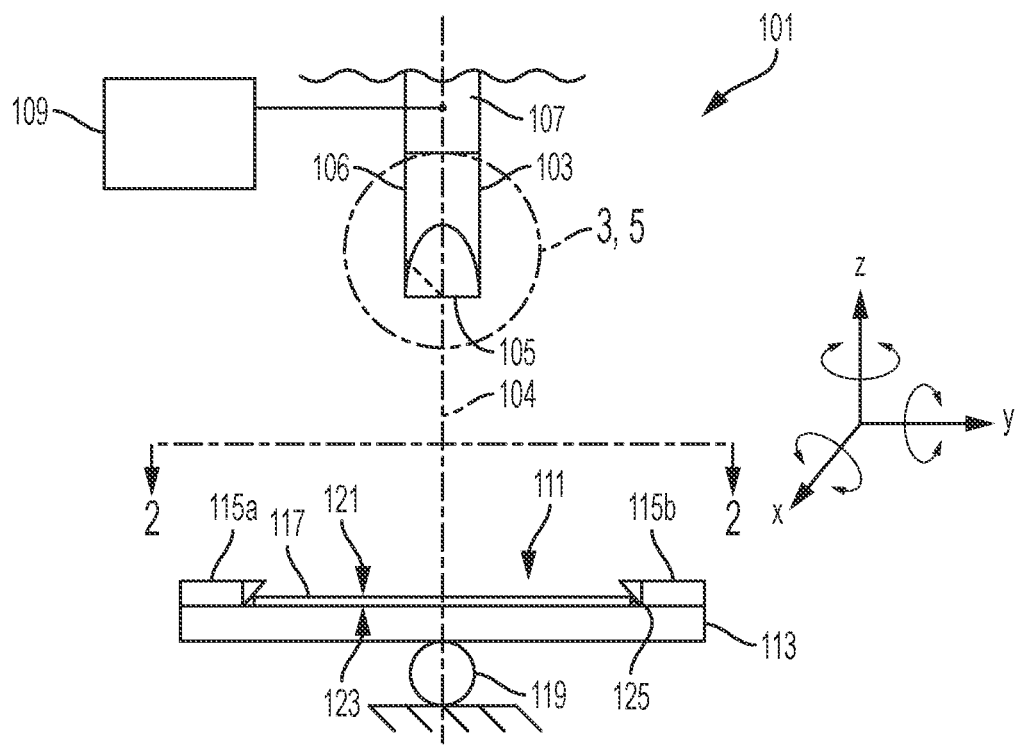
FIG. 1 is a schematic side view of a test apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, claims may encompass many different embodiments of various embodiments and should not be construed as limited to the embodiments set forth herein.

FIG. 1 illustrates a test apparatus 101 for determining a crush strength of an edge of a substrate. The test apparatus 101 may comprise a probe 103 that may extend along a probe axis 104 to an outer tip 105. As shown, in some embodiments the probe axis 104 may comprise an axis of symmetry for a shank portion 106 of the probe 103. In some embodiments, the probe 103 may tolerate the application of maximum loads of about 50 Newtons (N) or more, of about 100 N or more, or about 125 N or more or load within a range from about 50 N to about 200 N, from about 100 N to about 200 N, from about 125 N to about 200 N, from about 50 N to about 125N, from about 50 N to about 125 N, and all ranges and subranges therebetween.

In some embodiments, the probe 103 may comprise a probe material comprising a high-hardness (e.g., comprising a Knoop hardness about 1500 or more), a high modulus (e.g., Young's modulus about 400 GPa or more), or a combination of the above. Exemplary embodiments of such probe materials can comprise one or more of diamond, stainless steel, martensite, aluminum boride, boron carbide, beryllium carbide, silicon carbide, tungsten carbide, fused alumina, and fused zirconia. In other embodiments, probe materials of the probe 103 may be provided with a low coefficient of friction to avoid frictional contact forces that may potentially interfere with testing in some embodiments. In some embodiments, to provide a low coefficient of friction, the probe material may comprise a thermoplastic polymer. Use of a probe comprising a thermoplastic polymer can be beneficial in some embodiments where the test apparatus is used for quality control (e.g., a non-destructive test where the predetermined force, described below, is less than a quality specification value) as opposed to destructive testing. In some embodiments, thermoplastics for the probe material may comprise a glass transition temperature greater than room temperature (e.g., about 20° C. to about 25° C.). Embodiments of thermoplastics for use as the probe material can comprise polystyrene (PS), polycarbonate (PC), polyesters for example polyethyleneterephthalate (PET) or polyoxymethylene (POM), polyolefins for example polyethylene (PE), polyhalides for example polyvinylchloride (PVC), acrylic polymers comprising polymethyl methacrylate (PMMA) and poly(acrylonitrile-butadiene-styrene) (ABS), thermoplastic urethanes (TPU), polyetherimide (PEI), epoxies, polysulfonates, polysulfides, polyamides for example nylons, polyaramids, and blends or copolymers thereof. Exemplary embodiments of thermoplastic polymer blends with desirable dimensional stability and mechanical properties comprise blends comprising one or more of a polyaramid, a nylon, and polyoxymethylene.

Figure 4:
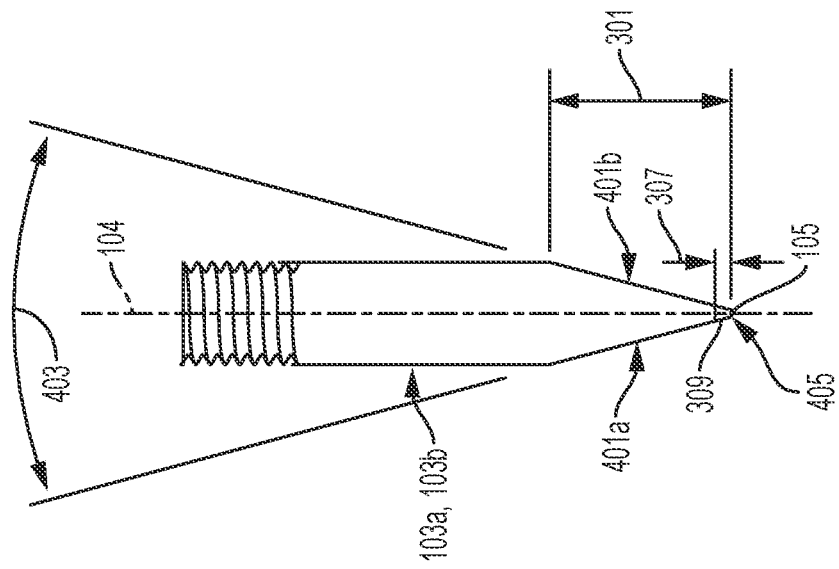
FIG. 4 is a left side view of the exemplary probe along line 4A-4A of FIG. 3 wherein a right side view of the probe along line 4B-4B of FIG. 3 would appear as a mirror image of FIG. 4.
Figure 6:
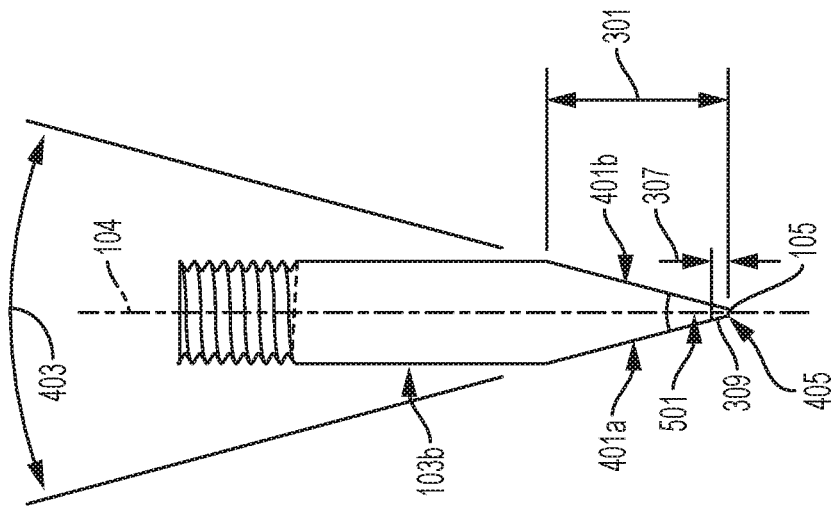
FIG. 6 is a left side view of the exemplary probe along line 6-6 of FIG. 5 wherein the right side view of the probe along line 4B-4B of FIG. 5 would appear as a mirror image of FIG. 4.

The probe 103 can comprise a wide range of shapes and sizes. In some embodiments, the probe may be provided as the probe 103a illustrated in FIG. 3. In further embodiments, the probe may be provided as the probe 103b illustrated in FIG. 5. As shown in FIG. 4, the probes 103a, 103b can each comprise a first surface 401a and a second surface 401b that converge toward the outer tip 105 of the probe 103. The inclined portions of the first and second surfaces 401a, 401b of the probe 103a, 103b may extend for an inclined length 301 in a direction of the probe axis 104. In some embodiments, the inclined length 301 may be the same as a probe length 303 shown in FIG. 3. In some embodiments, the inclined length 301 may be about 1 millimeter (mm) or more, about 3 mm or more, about 5 mm or more, or about 10 mm or more. In some embodiments, the inclined length 301 may be from about 1 mm to about 20 mm, from about 3 mm to about 30 mm, from about 5 mm to about 20 mm, from about 10 mm to about 20 mm, and all ranges and subranges therebetween. In further embodiments, the first surface 401a can comprise the illustrated first planar portion and the second surface 401b can comprise the illustrated second planar portion. In some embodiments, as shown in FIGS. 4 and 6, first planar portion of the first surface 401a and the second planar portion of the second surface 401b may extend at an angle 403 relative to the shank portion 106 of the probe 103a, 103b to converge along the inclined length 301 to the outer tip 105 of the probe 103a, 103b. In some embodiments, the angle 403 can be about 10° or more, about 20° or more, about 30° or more, about 45° or more, about 175° or less, about 160° or less, about 135° or less, about 120° or less, or about 90° or less. In some embodiments, the angle 403 may be from about 10° to about 175°, from about 10° to about 165°, from about 10° to about 135°, from about 10° to about 120°, from about 10° to about 90°, from about 20° to about 175°, from about 20° to about 165°, from about 20° to about 135°, from about 20° to about 120°, from about 20° to about 90°, from about 30° to about 175°, from about 30° to about 165°, from about 30° to about 135°, from about 30° to about 120°, from about 30° to about 90°, from about 45° to about 175°, from about 20° to about 165°, from about 45° to about 135°, from about 45° to about 120°, from about 45° to about 90°, and all ranges and subranges therebetween. In the illustrated embodiment, the probe axis 104 can bisect the angle 403 although the probe axis 104 may not bisect the angle 403 in other embodiments.

Figure 3:
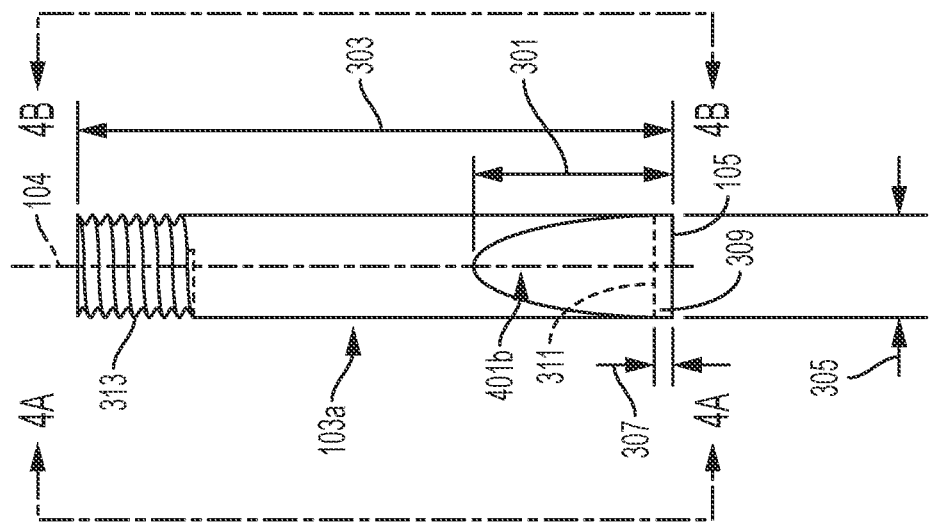
FIG. 3 is an enlarged front view of some embodiments of an exemplary probe taken at view 3 of FIG. 1.
Figure 5:
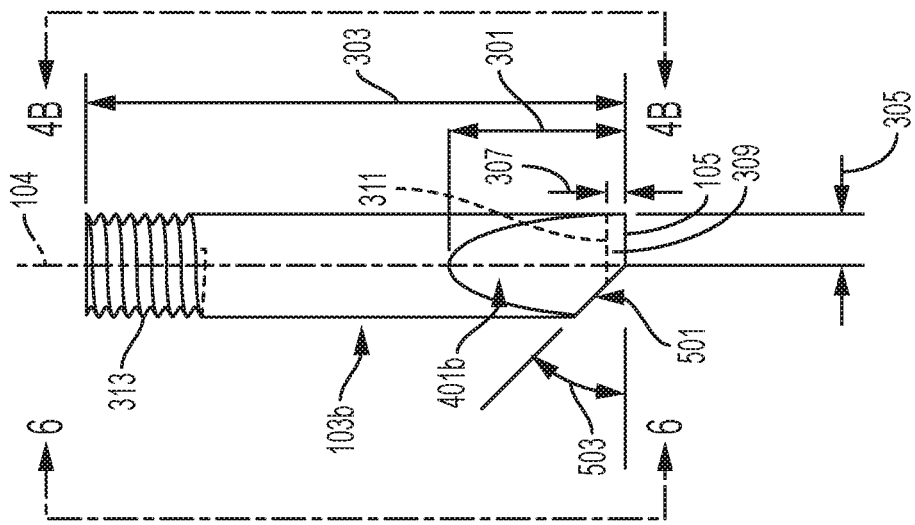
FIG. 5 in an enlarged front view of some embodiments of an exemplary probe taken at view 3 of FIG. 1.

In some embodiments, the outer tip 105 may comprise a rounded portion 405 at the intersection of the first surface 401a and the second surface 401b. In some embodiments, although not shown, the outer tip 105 may comprise a flat surface where the first and second surface 401a, 401b meet. As shown in FIGS. 3 and 5, the outer tip 105 of the probe 103a, 103b can comprise a probe tip width 305. In some embodiments, the probe tip width 305 may be about 1 mm or more, about 2 mm or more, about 20 mm or less, about 10 mm or less, or 5 mm or less. In some embodiments, the probe tip width 305 may be in a range from about 1 mm to about 20 mm, from about 1 mm to about 10 mm, from about 1 mm to about 5 mm, from about 2 mm to about 20 mm, from about 2 mm to about 10 mm, from about 2 mm to about 5 mm, and all ranges and subranges therebetween.

In some embodiments, the probe tip width 305 may be customized to a particular application. For example, in some embodiments, the probe 103a may be provided with the illustrated probe tip width 305 that may be desired in particular test methods. In further embodiments, a desired probe tip width 305 may be smaller than the probe tip width 305 shown in FIG. 3. In some embodiments, the probe 103 may be modified to reduce the size of the probe tip width 305. In some embodiments, reducing the size can comprise machining (e.g. drilling, grinding, milling, cutting) away a portion of the probe 103 to arrive at the probe 103b comprising the reduced probe tip width 305 that may be desired depending on the particular application. In some embodiments, as shown in FIGS. 5 and 6 the reduced size of the probe tip width 305 of the probe 103b can be provided with a third inclined surface 501 that intersects the first inclined portion of the first surface 401a and the second inclined portion of the second surface 401b while, as shown in FIG. 6, tapering toward the outer tip 105. As shown, in some embodiments, the third inclined surface 501 may comprise the illustrated third inclined planar surface. In further embodiments, the third inclined surface 501 may be inclined in an outward direction from the outer tip 105 at an angle 503 relative to a plane 311 defining the extent of an end portion 309 of the probe 103, discussed more fully below. In some embodiments, the angle 503 can be about 10° or more, about 15° or more, about 20° or more, about 30° or more, about 40° or more, about 60° or less, about 55° or less, about 50° or less, or about 45° or less. Consequently, the third inclined surface 501 can reduce the probe tip width 305. In some embodiments, the probe tip width 305 of the probe 103b of FIG. 5 may be less than the probe tip width 305 of the probe 103a of FIG. 3 by about 20% or more, about 30% or more, about 40% or more, about 90% or less, about 80% or less, about 70% or less, or about 60% or less.

As such, in some embodiments, the probe 103a may be provided with a wide range of desired probe tip widths depending on the particular application. Reduction of the probe tip width 305 can increase the effective pressure provided by the outer tip 105 of the probe 103 during testing methods without needing to increase an overall load applied by the probe 103 to achieve the same pressure. In some embodiments, decreasing the probe tip width 305 can increase the longevity of the probe and increase the dimensional stability of the probe 103. Furthermore, providing a generic probe 103 that can be modified to provide a desired reduced probe tip width 305 can reduce inventory costs since only a single probe 103 may need to be stocked instead of multiple probes with different probe tip widths depending on the particular application. When setting up the test apparatus 101, a desired probe tip width 305 can be determined. Then the probe 103 may be modified (e.g., machined) to generate a desired reduce probe tip width 305 customized for the particular test method (e.g., as shown by probe 103b in FIG. 5).

As discussed above, the outer tip 105 may be produced by tapering a first surface 401a and second surface 401b as shown in FIGS. 3 and 5. Moreover, as shown in FIG. 5, a third inclined surface 501 may be further provided to further modify the probe tip width 305 as discussed above. In further embodiments, the outer tip 105 of the probe 103 may be provided by other configurations not illustrated in the drawings. For example, in some embodiments, the probe 103 may comprise a frustoconical shape tapering toward the outer tip 105. In still other embodiments, the probe 103 may comprise a spheroidal or spherical shape that comprises the outer tip 105. In other embodiments, the probe 103 may comprise a tetrahedral shape with three planar surfaces tapering towards the outer tip 105. In yet other embodiments, the probe 103 may comprise more than three planar surfaces converging toward the outer tip 105. In still other embodiments, the probe 103 may comprise three or more planar surfaces that do not taper (i.e., the surfaces maintain the same distance and remain the same distance apart) toward the outer tip 105. The outer tip 105 for any of the embodiments of the probe 103 discussed throughout the disclosure may comprise a flat surface or a rounded (i.e., curved) surface.

Throughout the disclosure, an end portion 309 of any of the probes 103 of the disclosure (e.g., probe 103a, 103b) is defined as the portion of the probe 103 within a distance 307 of 0.25 mm from the outermost portion of the outer tip 105 and a plane 311 passing through the probe 103 that is perpendicular to the probe axis 104. In some embodiments, an outer surface area of the end portion 309 of the probe 103 can be about 0.5 $mm^2$ or more, about 1 $mm^2$ or more, about 1.5 $mm^2$ or more, about 2 $mm^2$ or more, about 3 $mm^2$ or more, about 5 $mm^2$ or less, about 4.5 $mm^2$ or less, about 4 $mm^2$ or less, or about 3.5 $mm^2$ or less. In some embodiments, the outer surface area of the end portion 309 of the probe 103 can be within a range from about 0.5 $mm^2$ to about 5 $mm^2$, from about 1 $mm^2$ to about 5 $mm^2$, from about 1.5 $mm^2$ to about 5 $mm^2$, from about 2 $mm^2$ to about 5 $mm^2$, about 3 $mm^2$ to about 5 $mm^2$, from about 0.5 $mm^2$ to about 4.5 $mm^2$, from about 1 $mm^2$ to about 4.5 $mm^2$, 1.5 $mm^2$ to about 4.5 $mm^2$, from about 2 $mm^2$ to about 4.5 $mm^2$, about 3 $mm^2$ to about 4.5 $mm^2$, from about 0.5 $mm^2$ to about 4 $mm^2$, from about 1 $mm^2$ to about 4 $mm^2$, from about 1.5 mm² to about 4 mm², from about 2 mm² to about 4 mm², about 3 mm² to about 4 mm², from about 0.5 mm² to about 3.5 mm², from about 1 mm² to about 3.5 mm², from about 2 mm² to about 3.5 mm², and all ranges and subranges therebetween. Providing the end portion 309 with the outer surface areas above can provide localized pressure to a test location proximate to the edge 125, which can promote failure (i.e., cracking) at the edge 125 as opposed to other portions of the substrate 117.

As shown in FIGS. 3 and 5, probes 103 of the disclosure can comprise an optional outer threaded end 313 designed to be threadedly received within an internally threaded portion of the test apparatus 101. In further embodiments, the test apparatus 101 may comprise a clamping chuck that can grip an outer end of the probe 103 in applications where the probe 103 may not be threaded. In such applications, the outer end may be circular cylindrical or may comprise a polygonal or other cross section to help prevent relative rotational movement between the clamping chuck and the probe 103. The outer threaded end 313 (or end that can be engaged by the clamping chuck discussed above) can allow the same test apparatus 101 to be used with a customized probe 103 comprising an outer tip 105 designed for the particular application.

As shown in FIG. 1, in some embodiments, a test apparatus 101 may be provided with a sensor 107. The sensor 107 can generate a signal that can be processed and displayed on a display 109. In some embodiments, the sensor 107 may comprise a force sensor, a pressure sensor, a displacement sensor, or a combination thereof. Example embodiments of force sensors comprise strain gauges (e.g., linear foil strain gauge, T-rosette strain gauge, double shear strain-gauge, wire strain gauge), force sensitive resistors (e.g., conductive polymer resistor), capacitive force sensors, and piezoelectric crystals (e.g., quartz). Example embodiments of pressure sensors comprise hydraulic load cells (e.g., water) and pneumatic load cells (e.g. air). Example embodiments of displacement sensors comprise capacitive, optical, eddy current, ultrasonic, and laser focused sensors.

Returning to FIG. 1, the test apparatus 101 may comprise a carrier 111. In some embodiments, the carrier 111 can comprises a plate 113 and a set of clamps 115a, 115b. The plate 113 can support a weight of a substrate 117 during testing while the clamps 115a, 115b can ensure that the substrate 117 does not move relative to the plate 113 during testing. In further embodiments, the clamps 115a, 115b can be adjusted to accommodate substrates of different sizes as well as to facilitate loading and unloading of the substrate 117 from the carrier 111. In other embodiments, the carrier 111 may comprise a flange that may be beveled or comprise a rim that may surround the substrate 117 so that the substrate 117 does not slide (i.e., move laterally) during testing and a bottom portion that may support a weight of the substrate 117. In further embodiments, the carrier 111 comprising a flange may comprise a plurality of beveled edges or rims that can accommodate differently sized substrates. In still other embodiments, the carrier 111 may comprise a frame that comprises edge portions that can prevent sliding and bottom portions can support a weight of the substrate 117, but unlike a flange, the frame may be adjustable to accommodate substrates of different sizes. In some embodiments, the carrier 111 and associated components can comprise a carrier material. The carrier material can comprise any of the probe materials discussed with respect to the probe 103 above. In some embodiments, the carrier material of the carrier 111 may be the same as the probe material of the probe 103.

In some embodiments, although not shown, the carrier 111 may comprise a plate (e.g., plate 113 in FIG. 1) and pegs that may prevent sliding of the substrate 117. In some further embodiments, the pegs may translate to accommodate substrates of different sizes. In other further embodiments, the plate may comprise a series of holes that may receive the pegs such that substrates of particular sizes can be accommodated. In still other further embodiments, the plate may comprise one or more recesses designed to receive a feature of the substrate 117 of a feature of a device (e.g., a portable electronic device) that the substrate 117 may be mounted on. In yet other further embodiments, the plate may comprise one or more raised shapes to receive a feature of the substrate 117.

In any case, the carrier 111 can define a support plane. In some embodiments, the support plane may be defined using the points of contact between the carrier 111 and the substrate 117. In other embodiments, the carrier 111 may comprise a planar shape that can be defined by a plane itself, which can be the support plane. Throughout the disclosure, an angle between the probe axis 104 and the carrier 111 can be defined as the angle formed by the intersection of the probe axis 104 with a support plane defined by the carrier 111 from the side closest to the probe 103. In some embodiments, a predetermined angle between the probe axis 104 and the carrier 111 (e.g., a planar surface of the carrier 111) can be about 10° or less, about 5° or less, about 3° or less, about 1° or less, about 0° or more or within a range from about 0° to about 10°, from about 0° to about 5°, from about 0° to about 3°, from about 0° to about 1°, and all ranges and subranges therebetween. In other embodiments, a predetermined angle between the probe axis 104 and the carrier 111 (e.g., a planar surface of the carrier 111) can be about 45° or less, about 40° or less, about 35° or less, about 30° or less, about 0° or more, about 5° or more, about 10° or more, about 20° or more, about 30° or more or within a range from about 0° to about 45°, from about 5° to about 45°, from about 10° to about 45°, from about 20° to about 45°, from about 30° to about 45°, from about 0° to about 40°, from about 30° to about 40°, from about 0° to about 35°, from about 30° to about 35°, from about 0° to about 30°, and all ranges and subranges therebetween.

The angle of the carrier 111 relative to the probe axis 104 may be adjusted to a predetermined angle using a joint 119, as shown in FIG. 1. The joint 119 (e.g., gimbal) can allow pivoting about any and/or all of the directional components x, y, and z as shown in FIG. 1. The joint 119 may be rotatable about a first adjustment axis that is perpendicular to the probe axis 104. In some embodiments, the joint may also be rotable about second adjustment axis that may be perpendicular to the first adjustment axis. In further embodiments, the second adjustment axis may be the probe axis 104. In other further embodiments, the second adjustment axis may be perpendicular to the probe axis 104. In some embodiments, the joint 119 may comprise a gimbal, as schematically shown as a ball in FIG. 1. In other embodiments, the joint may comprise a compound joint comprising one or more of a slider, a revolute, a cylindrical, a gimbal, and another articulating joint. In any of the above embodiments, the joint 119 may further comprise a lock that can prevent deviation from a predetermined adjusted angle and position between the probe axis 104 and the carrier 111.

Figure 7:
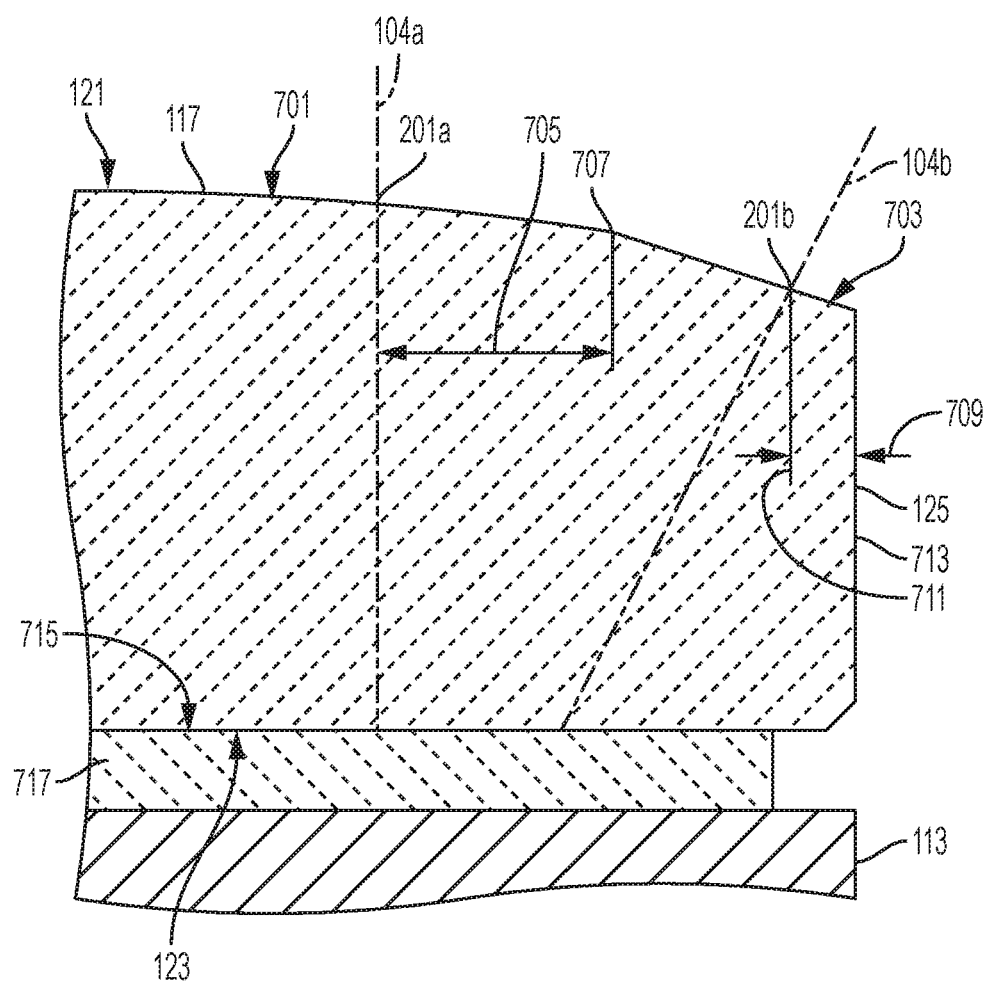
FIG. 7 is a cross-sectional view of some embodiments of the apparatus along lines 7-7 of FIG. 2.
Figure 8:
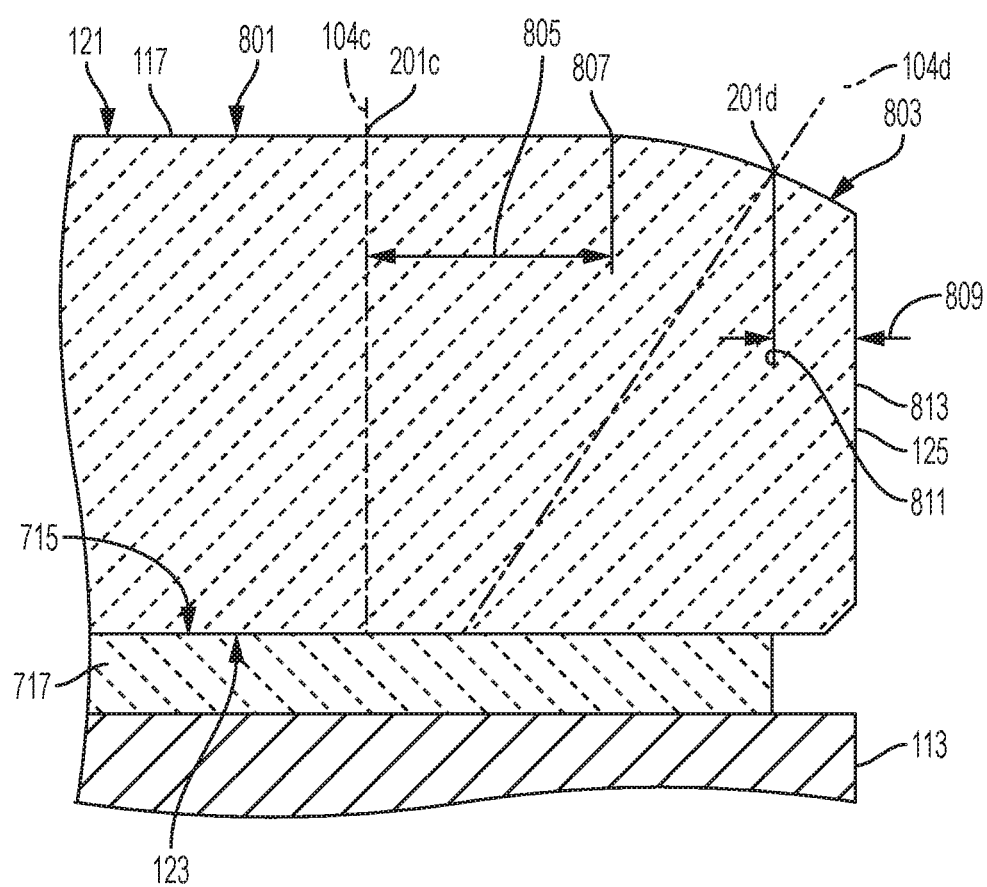
FIG. 8 is a cross-section view of other embodiments of the apparatus along lines 7-7 of FIG. 2.

The substrate 117 can be provided with a first major surface 121 and a second major surface 123 with an edge 125 extending between the first major surface 121 and the second major surface 123. In some embodiments, as shown in FIG. 7, the first major surface 121 may comprise a curved surface portion 701. In some embodiments, as shown in FIG. 8, the first major surface 121 may comprise a planar surface portion 801. In some embodiments, as shown in FIG. 7, the edge 125 of the substrate 117 may comprise a flat edge surface portion 703. In other embodiments, as shown in FIG. 8, the edge 125 of the substrate 117 may comprise a curved edge surface portion 803. Although not shown, in some embodiments, the substrate may comprise the curved surface portion 701 of FIG. 7 and the curved edge surface portion 803 of FIG. 8. In further embodiments, although not shown, in some embodiments the substrate may comprise the planar surface portion 801 of FIG. 8 and the flat edge surface portion 703 of FIG. 7. In some embodiments, although not shown, the first major surface 121 of the substrate 117 may comprise both a flat surface (e.g., planar surface portion 801) and a curved surface (e.g., curved surface portion 701). In some embodiments, although not shown, the edge 125 of the substrate 117 may comprise both a flat surface (e.g., flat edge surface portion 703) and a curved surface (e.g., curved edge surface portion 803). In some embodiments, although not shown, the first major surface 121 may be a planar surface.

Figure 2:
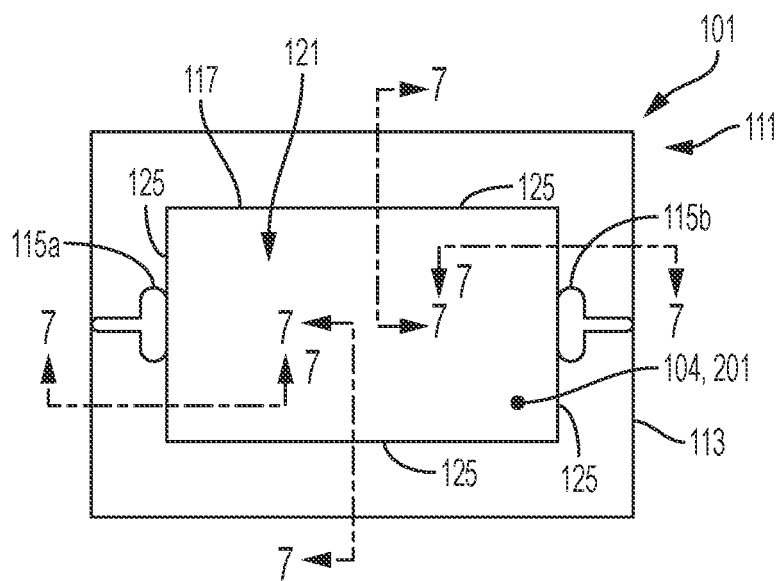
FIG. 2 is a schematic top view of the test apparatus along line 2-2 of FIG. 1 in accordance with embodiments of the disclosure.

As shown in FIG. 2, a first test location 201 can be defined by the intersection of a surface the substrate 117 and the probe axis 104 at a predetermined position and angle relative to the carrier 111. In some embodiments, as shown in FIG. 7, the first test location 201a may be located on the curved surface portion 701 of the first major surface 121 of the substrate 117 when the probe axis 104a intersects the first major surface 121 of the substrate 117. In some embodiments, as shown in FIG. 8, the first test location 201c may be located on the planar surface portion 801 of the first major surface 121 of the substrate 117 when the probe axis 104c intersects the first major surface 121 of the substrate 117. In some embodiments, as shown in FIG. 7, the first test location 201b may be located on the flat edge surface portion 703 of the edge 125 of the substrate 117 when the probe axis 104b intersects the edge of the substrate 117. In still other embodiments, as shown in FIG. 8, the first test location 201d may be located on the curved edge surface portion 803 of the edge 125 of the substrate 117 when the probe axis 104d intersects the edge 125 of the substrate 117.

In some embodiments, the predetermined angle between the probe axis 104 and the carrier 111 can be chosen such that the angle between a surface tangent to the substrate 117 at a first test location 201 and the probe axis 104 may be about 90° or less, about 60° or less, about 30° or more, about 45° or more or within a range from about 30° to about 90°, from about 45° to about 90°, from about 30° to about 60°, from about 45° to about 60°, and all ranges and subranges therebetween.

Throughout the disclosure, a test location that is positioned on the first major surface of the substrate may comprise a test distance from an edge that can be defined as the distance between a first point at the test location on a surface of the substrate and a second point on the edge of the substrate, where the first point and the second point are as close together as possible. Referring to FIG. 7, a first test distance 705 of the first test location 201a can be defined as the distance between a first point at the first test location 201a on the first major surface 121 of the substrate 117 (i.e., where the probe axis 104a intersects the first major surface 121) and a second point 707 on the edge 125 of the substrate where the first point and the second point are as close together as possible. Referring to FIG. 8, a first test distance 805 of the first test location 201c can be defined as the distance between a first point at the first test location 201c on the first major surface 121 of the substrate 117 (i.e., where the probe axis 104c intersects the first major surface 121) and a second point 807 on the edge 125 of the substrate where the first point and the second point are as close together as possible. In some embodiments, the first test distance 705, 805 may be about 10 mm or less, about 6 mm or less, about 4 mm or less, about 3 mm or less, about 2 mm or less, or about 1 mm or more. In some embodiments, the first test distance 705, 805 may be within a range from about 1 mm to about 10 mm, from about 1 mm to about 6 mm, from about 1 mm to about 4 mm, from about 1 mm to about 3 mm, from about 1 mm to about 2 mm.

In other embodiments, a test location that is positioned on the edge may comprise a test distance defined as the distance between a line passing through a first point at the test location on the edge, wherein the line is parallel to the outermost periphery of the edge, and a point on an outermost periphery of the edge. For instance, as shown in FIG. 7, the first test location 201b that is positioned on the edge 125 may comprise a test distance 709 between a line 711 passing through the first point at the first test location 201b on the edge 125, wherein the line 711 is parallel to the outermost periphery 713 of the edge 125, and a point on the outermost periphery 713 of the edge 125. As shown in FIG. 8, the first test location 201d that is positioned on the edge 125 may comprise a test distance 809 between a line 811 passing through the first point at the first test location 201d on the edge 125, wherein the line 811 is parallel to the outermost periphery 813 of the edge 125, and a point on the outermost periphery 813 of the edge 125. In some embodiments, the test distance 709, 809 may be about 1 mm or less, about 500 micrometers (μm) or less, about 200 μm or less, about 100 μm or less, or about 0 μm.

Throughout the disclosure, in some embodiments, testing methods with the probe 103 can provide a test configuration where the direction of the probe width 305 may be substantially perpendicular to the edge 125 being tested. In some embodiments, the direction of the probe width 305 may be substantially parallel to the edge 125 being tested. In still other embodiments, the direction of the probe width 305 may be neither parallel nor perpendicular to the edge 125 being tested.

In some embodiments, as shown in FIGS. 1 and 2, the substrate 117 may be mounted directly on the carrier 111. In other embodiments, the substrate 117 may mounted on another object with a shape and/or mechanical properties similar to that of a display, as described below, that the substrate 117 may be used in combination with. In some further embodiments, as shown in FIGS. 7 and 8, the second major surface 123 of the may be attached to a first major surface 715 of a glass-based substrate 717. As used herein, "glass-based" means a glass substrate or a glass-ceramic substrate, wherein a glass-ceramic includes one or more crystalline phases and an amorphous residual glass phase. In some even further embodiments, the substrate 117 may function as a protective cover for the glass-based substrate 717 (i.e., the substrate 117 may be a screen protector). In some even further embodiments, the glass-based substrate 717 may comprise a surface of a device, described below. In other embodiments, the substrate 117 may comprise a display. Throughout the disclosure, a display can comprise a liquid crystal display (LCD), electrophoretic display (EPD), organic light emitting diode display (OLED), plasma display panel (PDD), or a touch sensor integrated display. In further embodiments, the first major surface 121 of the display (i.e., substrate 117) can comprise a sheet of glass. In some embodiments, the display may be part of a mobile electronic device (e.g., smartphone, watch, tablet, laptop). In other embodiments, the substrate 117 may be mounted on a surface of a device opposite another surface comprising a display. In other embodiments, the substrate 117 may comprise a device for example a silicon wafer, a printed circuit board, a photovoltaic device, or a ceramic device. In some embodiments, as shown in FIGS. 7-8, the second major surface 123 of the substrate 117 may comprise a planar surface portion. In further embodiments, as shown in FIGS. 7-8, the second major surface 123 of the substrate 117 may entirely comprise a planar surface. In other embodiments, although not shown, the second major surface 123 may comprise a curved portion. In some embodiments, the substrate 117 may be mounted on a surface (e.g., carrier 111, glass-based substrate 717), where the surface closest to the second major surface 123 of the substrate 117 comprises substantially the same contour as the second major surface 123 as the substrate 117. In some embodiments, the substrate 117 may be mounted on a surface other than a glass-based substrate (e.g., opposite the display of a mobile electronic device).

Figure 9:
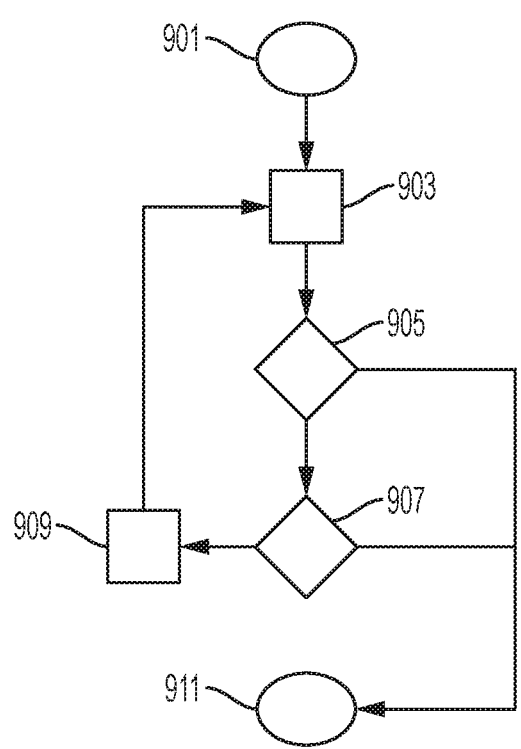
FIG. 9 is a flow chart illustrating methods of using the testing apparatus to determine a crush strength of an edge in accordance with the embodiments of the disclosure.

The disclosed test apparatus 101 can be used in methods of determining a crush strength of an edge of the substrate 117, as described in the flowchart shown in FIG. 9. The first step 901 of the testing methods may be to adjust the substrate 117 in the carrier 111 so that the probe axis 104 impinges on the substrate 117 at the first test location 201 at a predetermined angle of incidence relative to a plane defined by the carrier 111. The second step 903 may be to move the probe 103 along the probe axis 104 toward the substrate 117 and/or to move the substrate 117 along the probe axis 104 toward the probe 103 such that the outer tip 105 of the probe 103 contacts the substrate 117 at the first test location 201 to apply a predetermined testing load to the substrate 117, as indicated on the display 109. Next, it may be determined if the substrate 117 has failed by cracking at the first test location 201, as indicated by the first diamond 905 in FIG. 9. If the substrate 117 has cracked, then the next step 911 is performed. If the substrate 117 has not cracked, then it may be determined if the current predetermined testing load is equal to the predetermined maximum load, as indicated by the second diamond 907 in FIG. 9. If the current predetermined testing load is equal to the predetermined maximum load, then the next step 911 is performed. If the predetermined maximum load has not been reached, then the predetermined testing load may be increased by a predetermined amount, as indicated by the box 909 to the left of the second diamond 907 in FIG. 9. Then, the second step 903 and two evaluation steps (i.e., 905, 907) are repeated until either the substrate 117 has failed by cracking at the first test location 201 or the predetermined maximum load may be equal to the current predetermined testing load. Failure may be determined using manual visual detection or mechanical optical detection looking for a macroscopic crack in the substrate 117. Alternatively, failure may be determined using acoustic detection since brittle materials (e.g., substrate 117) often create a sound when cracking. Alternatively, the sensor 107 may detect a change (e.g., force spike) indicative of failure. Once the substrate 117 has failed by cracking at the first test location 201 or the predetermined maximum load is equal to the current predetermined testing load, then the next step 911 can be to determine the crush strength of the edge of the substrate 117 tested based on the mechanical force applied by the probe 103 (i.e., the current predetermined testing load when this step is reached). If the substrate 117 failed, then the load at failure can be a single value. Otherwise, the testing methods have determined a lower bound for the load at failure (e.g., 50 Newtons or more, at least 50 N).

The result of the test methods illustrated in FIG. 9 may be reported as the "crush strength" in terms of the load at failure (e.g., in units of Newtons), which is the predetermined testing load when reaching the last step of the testing methods described above. Also, the crush strength of the edge of the substrate 117 tested can be reported as a pressure (e.g., in units of MegaPascals) if the area normal to the force applied by the probe 103 is considered. Alternatively, the crush strength of the edge of the substrate 117 can be reported as an index number that may not be a true pressure if the area of the probe 103 in contact with the substrate 117 at the final predetermined testing load is considered. In some embodiments, the test methods illustrated in FIG. 9 can be repeated for the same substrate 117 if the probe axis 104 is moved from the first test location 201 to a second test location to obtain a second estimate of the crush strength. In further embodiments, it may be possible to obtain 2 or more, 3 or more, 4 or more, 5 or more, or 6 or more estimates of the crush strength using different locations on a substrate 117.

In some embodiments, the load applied to the substrate 117 by the probe 103 can be generated by moving the carrier 111 relative to the probe 103 and a laboratory reference frame. In some embodiments, the load applied to the substrate 117 by the probe 103 can be generated by moving the probe 103 relative to the carrier 111 and a laboratory reference frame. In further embodiments, both the carrier 111 and the probe 103 can move relative to the laboratory reference plane. In some embodiments, the relative movement between the carrier 111 and the probe 103 can be generated by manually adjusting a crank or an arbor arm. In other embodiments, the relative movement between the carrier 111 and the probe 103 can be generated my mechanical means, for example, a linear actuator (e.g., screw, wheel and axle, cam) or a rotary actuator (e.g., stepper, servo).

In some embodiments, the test load can be increased in steps, as described above. In some embodiments, the amount that the predetermined load is increased by can be about 0.1 Newtons (N) or more, about 0.5 N or more, about 1 N or more, about 2 N or more, about 5 N or more, about 10 N or more, about 50 N or less, about 30 N or less, about 20 N or less, or about 10 N or less. In some embodiments, the amount that the predetermined load is increased can be within a range from about 0.1 N to about 50 N, from about 0.1 N to about 30 N, from about 0.1 N to about 20 N, from about 0.2 N to about 50 N, from about 0.2 N to about 20 N, from about 0.5 N to about 50 N, from about 0.5 N to about 20 N, from about 1 N to about 50 N, from about 1 N to about 30 N, from about 1 N to about 30 N, from about 1 N to about 20 N, from about 2 N to about 50 N, from about 2 N to about 30 N, from about 2 N to about 20 N, from about 5 N to about 50 N, from about 5 N to about 30 N, from about 5 N to about 20 N, from about 10 N to about 20 N, and all ranges and subranges therebetween. In further embodiments, the amount that the predetermined load is increased by can be constant throughout a test. In other further embodiments, the amount that the predetermined load is increased may decrease as the test proceeds.

In other embodiments, the test load can be continuously increased at a predetermined loading rate. Since the crush strength is designed to be a static material property (as opposed to a shock test imposing an impulsive impact), it may be desirable that the rate be slow enough that a quaisistatic approximation is valid for the loading. The validity of the quaisistatic approximation for a first rate can be verified by comparing the load at failure using the first rate and the load at failure using a second rate, where the second rate is about half the first rate. The approximation may be valid if the difference is about 10% or less, about 5% or less, about 2% or less, or about 1% or less of the load at failure observed using the second rate. In some further embodiments, the predetermined loading rate may be about 0.1 N/min or more, about 0.2 N/min or more, about 0.5 N/min or more, about 1 N/min or more, about 2 N/min or more, about 5 N/min or more, about 10 N/min or more, about 200 N/min or less, about 180 N/min or less, about 150 N/min or less, about 120 N/min or less, about 100 N/min or less, about 80 N/min or less, about 60 N/min or less, about 30 N/min or less, or about 20 N/min or less. In some further embodiments, the predetermined loading rate may be within a range from about 0.1 N/min to about 200 N/min, from about 0.2 N/min to about 180 N/min, from about 0.5 N/min to about 150 N/min, from about 1 N/min to about 120 N/min, from about 1 N/min to about 100 N/min, from about 1 N/min to about 80 N/min, from about 1 N/min to about 30 N/min, from about 1 N/min to about 20 N/min, from about 2 N/min to about 180 N/min, from about 2 N/min to about 150 N/min, from about 2 N/min to about 120 N/min, from about 2 N/min to about 100 N/min, from about 2 N/min to about 80 N/min, from about 2 N/min to about 60 N/min, from about 5 N/min to about 150 N/min, from about 5 N/min to about 120 N/min, from about 5 N/min to about 100 N/min, from about 5 N/min to about 80 N/min, from about 5 N/min to about 60 N/min, from about 5 N/min to about 30 N/min, from about 10 N/min to about 120 N/min, from about 10 N/min to about 60 N/min, from about 10 N/min to about 30 N/min, and all ranges and subranges therebetween. In some even further embodiments, the predetermined loading rate can be constant throughout a test. In other even further embodiments, the predetermined loading rate can decrease as the test proceeds.

Additional details of substrates comprising screen protectors that may be tested using the test methods and apparatus disclosed herein can be found in concurrently filed patent application titled "Screen Protector Comprising a Glass-based Substrate and an Adhesive", having U.S. Appl. No. 62/718,560, which is hereby incorporated by reference in its entirety. U.S. application Ser. No. 16/538,337, filed Aug. 12, 2019, now U.S. Pat. No. 11,334,116 issued May 17, 2022, claims the benefit of priority of U.S. Appl. No. 62/718,560.

Directional terms as used herein—for example up, down, right, left, front, back, top, bottom—are made only with reference to the figures as drawn and are not intended to imply absolute orientation.

As used herein, the terms "comprising" and "including", and variations thereof, shall be construed as synonymous and open-ended, unless otherwise indicated.

As used herein the terms "the," "a," or "an," mean "at least one," and should not be limited to "only one" unless explicitly indicated to the contrary. Thus, for example, reference to "a component" comprises embodiments comprising two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to comprise the specific value or end-point referred to. Whether or not a numerical value or end-point of a range in the specification recites "about," the numerical value or end-point of a range is intended to comprise two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A test apparatus comprising:
a carrier rotatable about a first adjustment axis, and configured to support a substrate; and
a probe movably mounted relative to the carrier, the probe comprising an end portion extending 0.25 mm from an outer tip of the probe, wherein a surface area of the end portion is about 5 mm$^2$ or less,
wherein the test apparatus is configured to crack the substrate.

2. The test apparatus of claim 1, wherein the probe is movable relative to the carrier along a probe axis that is perpendicular to the first adjustment axis.

3. The test apparatus of claim 1, further comprising a lock to releasably fix the carrier in a selected position relative to the first adjustment axis.

4. The test apparatus according to claim 1, wherein the carrier is rotatable about a second adjustment axis perpendicular to the first adjustment axis and the probe axis.

5. The test apparatus of claim 1, wherein the carrier comprises a clamp.

6. The test apparatus of claim 1, wherein the probe comprises a thermoplastic polymer.

7. The test apparatus of claim 1, wherein the probe comprises a first surface and a second surface, wherein the first surface and the second surface converge toward the outer tip of the probe.

8. The test apparatus of claim 7, wherein the probe further comprises a third surface that intersects the first surface and the second surface while tapering toward the outer tip of the probe.

9. The test apparatus of claim 1, further comprising a device configured to determine one or more of a force, a displacement, or a pressure applied by the probe.

10. Methods of determining a crush strength of an edge of a substrate comprising a first major surface and a second major surface with the edge extending between the first major surface and the second major surface, the methods comprise:

adjusting a predetermined angle between the substrate and a direction of a probe axis;

applying a mechanical force to a first test location of the substrate with a probe in the direction of the probe axis, the probe comprising an end portion extending 0.25 mm from an outer tip of the probe, wherein a surface area of the end portion is about 5 mm$^2$ or less, wherein the probe is configured to crack the substrate;

increasing the mechanical force applied by the probe in the direction of the probe axis until the substrate cracks or a predefined force applied by the probe is reached; and determining the crush strength of the edge based on the mechanical force applied by the probe.

11. The methods of claim 10, wherein the first test location is less than or equal to about 10 mm from the edge of the substrate.

12. The methods of claim 10, wherein the edge comprises a curved edge surface.

13. The methods of claim 12, wherein the first test location comprises a portion of the curved edge surface of the edge.

14. The methods of claim 10, wherein the first test location comprises a portion of a surface of the edge.

15. The methods of claim 14, wherein the portion of the first major surface of the substrate is curved.

16. The methods of claim 10, wherein the probe comprises a first surface and a second surface, wherein the first surface and the second surface converge toward an outer tip of the probe.

17. The methods of claim 16, wherein the probe further comprises a third surface that intersects the first surface and the second surface while tapering toward the outer tip of the probe.

18. The methods of claim 10, wherein the predetermined angle is within a range of from about 0° to about 45°.

19. The methods of claim 10, wherein the predefined force applied by the probe is within a range from about 50 N to about 200 N.

* * * * *